US008837488B2

(12) United States Patent
Rajapakse

(10) Patent No.: US 8,837,488 B2
(45) Date of Patent: Sep. 16, 2014

(54) TWO TIER MULTIPLE SLIDING WINDOW MECHANISM FOR MULTIDESTINATION MEDIA APPLICATIONS

(75) Inventor: Ravi U. Rajapakse, San Francisco, CA (US)

(73) Assignee: Blackfire Research Corporation, San Francisco, CA (US)

( * ) Notice: Subject to any disclaimer, the term of this patent is extended or adjusted under 35 U.S.C. 154(b) by 86 days.

(21) Appl. No.: 13/561,030

(22) Filed: Jul. 28, 2012

(65) Prior Publication Data
US 2013/0028263 A1  Jan. 31, 2013

Related U.S. Application Data

(60) Provisional application No. 61/512,924, filed on Jul. 29, 2011.

(51) Int. Cl.
*H04L 12/801* (2013.01)
*H04L 29/06* (2006.01)
*H04L 12/861* (2013.01)
*H04Q 11/04* (2006.01)

(52) U.S. Cl.
CPC ............ *H04L 65/4076* (2013.01); *H04L 65/80* (2013.01); *H04L 69/166* (2013.01); *H04L 69/163* (2013.01); *H04L 65/608* (2013.01)
USPC ...................................................... 370/394

(58) Field of Classification Search
CPC ......... H04L 47/10; H04L 47/34; H04L 29/06; H04L 49/90; H04Q 11/0478
See application file for complete search history.

(56) References Cited

U.S. PATENT DOCUMENTS 7,577,782 B2 *  8/2009  Lym et al. ...................... 710/313
7,869,428 B2 *  1/2011  Shake et al. ................... 370/389

(Continued)

OTHER PUBLICATIONS

Singh, K.D.; Huszák, Árpád; Ros, D.; Viho, C.; Jeney, Gábor, "Congestion Control and Adaptive Retransmission for Multimedia Streaming over Wireless Networks," Next Generation Mobile Applications, Services and Technologies, 2008. NGMAST '08. The Second International Conference on, vol., No., pp. 363,369, Sep. 16-19, 2008 doi: 10.1109/NGMAST.2008.74.*

(Continued)

*Primary Examiner* — Andrew Lai
*Assistant Examiner* — Hoyet H Andrews, III
(74) *Attorney, Agent, or Firm* — Galvin Patent Law LLC; Brian R. Galvin

(57) ABSTRACT

Some media applications use media that contains multiple types of media components in it and media sources with access to this media must send each type of media component to one or more media rendering destination devices. Furthermore there may be multiple destinations that can receive a particular type of media component and the media must be received at each destination without losses. This invention describes a two tier packet buffer structure at the media source with primary and virtual packet buffers that ensures minimal memory use at the media source and minimal network use. Furthermore the use of a sliding window with each virtual packet buffer associated with each destination, independently keeps control and track of destination state, ensuring the correct receipt of media data at each destination.

5 Claims, 6 Drawing Sheets

(56) References Cited

U.S. PATENT DOCUMENTS

| | | | |
|---|---|---|---|
| 8,130,674 B2* | 3/2012 | Plotnik et al. | 370/254 |
| 8,184,540 B1* | 5/2012 | Perla et al. | 370/235 |
| 8,321,564 B2* | 11/2012 | Palm et al. | 709/225 |
| 2006/0039280 A1* | 2/2006 | Anandakumar et al. | 370/229 |
| 2007/0180137 A1* | 8/2007 | Rajapakse | 709/231 |
| 2009/0052380 A1* | 2/2009 | Espelien | 370/328 |
| 2010/0198936 A1* | 8/2010 | Burchard et al. | 709/212 |
| 2013/0151726 A1* | 6/2013 | Barber | 709/245 |

OTHER PUBLICATIONS

Yanfeng Zhang; Cuirong Wang; Bing Zhou; Yuan Gao, "An Overlap Virtual Networks Testbed for Future Real-Time Multimedia Transmission," MultiMedia and Information Technology, 2008. MMIT '08. International Conference on, vol., No., pp. 635,638, Dec. 30-31, 2008, doi: 10.1109/MMIT.2008.10.*

Do Minh Ngoc; Phan Anh Tan; Jong Soo Lee; Hoon Oh, "Improvement of IEEE 802.11 for multimedia traffic in wireless LAN," Wireless Telecommunications Symposium, 2007. WTS 2007, vol., No., pp. 1,4, Apr. 26-28, 2007 doi: 10.1109/WTS.2007.4563296.*

Zheng Jian-Li; Wang Xue-Ping; Zhang Gen-Du, "MPSSF: a buffering & forwarding handover scheme reducing out-of-sequence packets," Computer Networks and Mobile Computing, 2003. ICCNMC 2003. 2003 International Conference on, vol., No., pp. 478,482, Oct. 20-23, 2003, doi: 10.1109/ICCNMC.2003.1243095.*

Awad, A.; Sivakumar, R.; McKinnon, M.W., "MPFD: a lookahead based buffer management scheme for MPEG-2 video traffic," Computers and Communication, 2003. (ISCC 2003). Proceedings. Eighth IEEE International Symposium on, vol., No., pp. 893,898 vol. 2, Jun. 30-Jul. 3, 2003, doi: 10.1109/ISCC.2003.1214230.*

* cited by examiner

US 8,837,488 B2

TWO TIER MULTIPLE SLIDING WINDOW MECHANISM FOR MULTIDESTINATION MEDIA APPLICATIONS

CROSS REFERENCE TO RELATED APPLICATIONS

This application claims priority under 35 U.S.C. §119(e) to U.S. Provisional Patent Application Serial No. 61/512,924, filed Jul. 29, 2011, entitled "Techniques for broadcasting media over a local network to multiple destinations" the entire content of which is incorporated herein by reference.

BACKGROUND OF THE INVENTION

Field of the Invention

The present invention is directed to network communications and to digital media sourcing, transmission and rendering.

SUMMARY OF THE INVENTION

The present invention is directed to media applications that use media containers, media files or media streams that contain multiple types of media components in it and that use a media source with access to this media to send each type of media component to one or more media rendering destination devices. Each such media destination is tailored to receive one of these media components. Furthermore there may be multiple destinations that can receive a particular type of media component. For example, a media application might use a media file with one video media component and one stereo audio media component and want to send this to two video rendering devices and four stereo audio devices. In such applications, firstly it is important to avoid duplicating media data stored and manipulated in the media source in order to avoid wasting media source memory. Secondly, it is important to avoid retransmitting the same media data over a network to avoid wasting network bandwidth.

In addition the present invention is directed to media applications that need to send media to multiple destinations where the network link has a high likely hood of losing media data and it is necessary to recover from such data loses and provide the destinations with correct data. To do this it is necessary to maintain independent data receipt status at the media source for each destination and to retransmit data that is needed by each destination appropriately.

In addition the present invention is directed to media applications that need to control the overall media transfer rate to each of these multiple destinations independently.

This invention describes a two tier buffer structure at the media source, with primary media packet buffers and virtual media packet buffers. There is one primary media packet buffer for each media component type. Each primary media packet buffer has a set of one or more virtual media packet buffers associated with it. Each virtual packet buffer is also associated with one of the media destination devices that take a media component type that is the same as the media component type in the primary media buffer. Media packets of a particular media component type are only placed in one primary media packet buffer. Each virtual media packet buffer associated with this primary buffer gets a reference to this media packet and a reference counter in the media packet is used to track how many entities are using this packet.

Furthermore, this invention describes a sliding window mechanism with each virtual buffer that controls the transmission of media packets to the associated media destination. The size of each sliding window affects the number of packets that may be in transit and therefore determines the packets that may be in transit independently to each destination device.

This design uses multiple buffers and references to media packets to minimize memory use at the media source and uses multiple sliding windows on multiple virtual buffers to minimize network traffic while guaranteeing the correct receipt of media data at each destination.

DETAILED DESCRIPTION OF THE INVENTION

Figure 1:
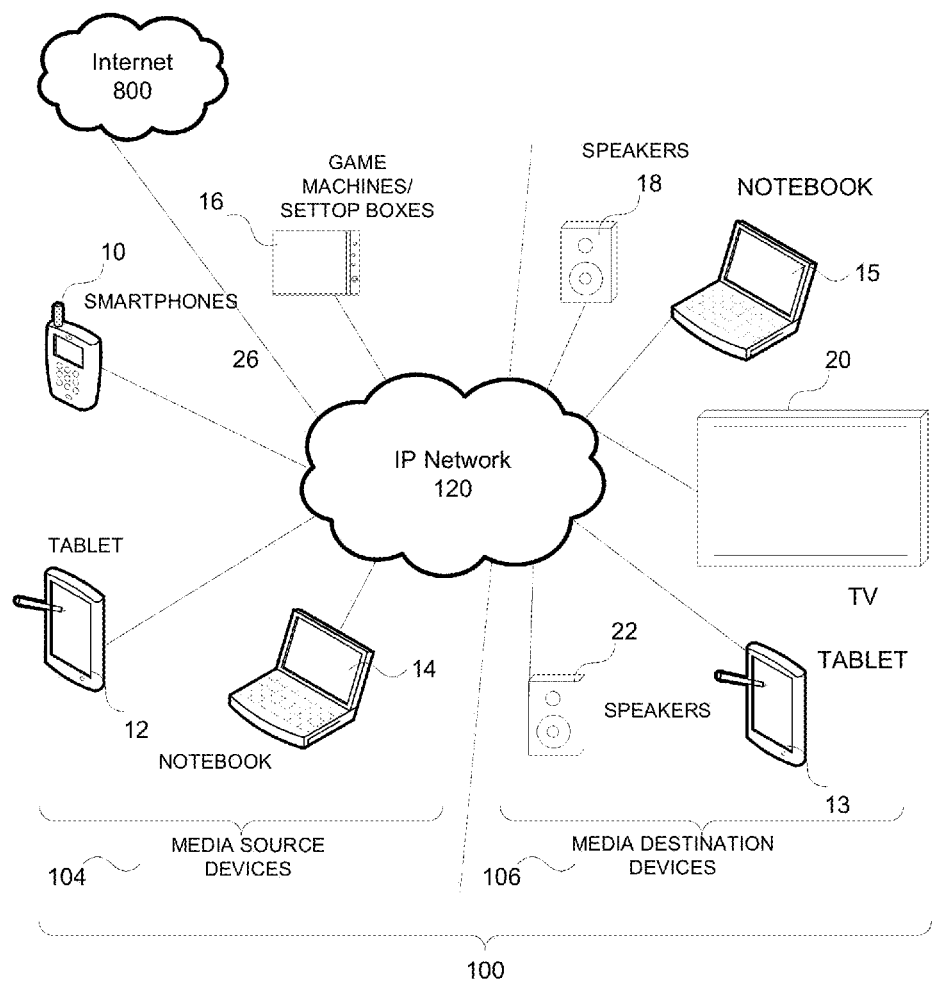
FIG. 1 illustrates an overview of the devices in a system in accordance with one embodiment.

Today there are many forms of digital media, many types of digital media sources, many types of digital media playback (rendering) systems and lots of ways of connecting media sources to media playback systems.

Digital media, hereafter referred to as media, comes in many forms, formats and containers, including Digital Video Disks, media files and media streams. The media contents can be audio, video, images or meta data media components and various combinations of each. For example a popular audio format is known as MP3 and a popular video format is H264. MP3 is an audio-specific media format that was designed by the Moving Picture Experts Group (MPEG) as part of its MPEG-1 standard and later extended in the MPEG-2 standard. H264 is a standard developed by the International Organization for Standardization (ISO)/International Electrotechnical Commission (IEC) joint working group, the Moving Picture Experts Group (MPEG). Movies are typically multimedia formats with a video and multiple audio channels in it. For example a 5.1 movie contains 1 video channel (media component) and 6 audio channels (audio components). 5.1 is the common name for six channel surround sound multichannel audio systems.

Digital media sources include media devices such as Digital Video Disk players, Blu-ray players, computer and mobile devices, and internet based "cloud" media services. Blu-ray Disc (BD) is an optical disc storage medium developed by the Blu-ray Disc Association. Internet based media services include services such as Netflix™ and Spotify™. Netflix is a media service and trademark of Netflix Inc. Spotify is a media service and trademark of Spotify Ltd. Digital media playback (media rendering destinations) systems include computer based devices, laptops and smartphones, as well as network audio and video devices. A SmartTV is an example of a digital media rendering device that can play media from an internet (cloud) based media service such as Netflix™. A SmartTV, which is also sometimes referred to as "Connected TV" or "Hybrid TV", is used to describe the integration of the internet and Web features into modern television sets and set-top boxes, as well as the technological convergence between computers and these television sets/set-top boxes. An internet radio device is another example of a digital media rendering device.

The connectivity between these media sources and devices is varied, but is evolving over time towards network based connectivity using IP protocols. This is because IP connectivity is convenient, ubiquitous and cheap. IP stands for Internet Protocol. An IP networked device is a device that adheres to the Internet Protocol suite standard. The Internet Protocol suite is defined by the Internet Engineering Task Force [IETF] standards body. The Internet is a global system of interconnected computer networks that use the standard Internet Protocol (IP) suite.

IP networks come in many forms; the most prevalent being Ethernet based wired IP networking. Ethernet is a family of computer networking technologies for local area networks (LANs) that is standardized as IEEE (Institute of Electrical and Electronics Engineers) Standard 802.3. In recent years with the prevalence of mobile computing devices, Wi-Fi has become the most popular means for connecting network devices wirelessly. Wi-Fi is a trademark of the Wi-Fi Alliance and a brand name for products using the IEEE 802.11 family of standards. A Wi-Fi network is a type of IP network.

The convenience and benefits of IP networking means that all of these media sources and playback systems, if not already network enabled, are becoming network enabled. Many Blu-ray players now have Ethernet and Wi-Fi network connectivity. Today most higher end TVs are smart TVs that have network capability. Similarly audio play back devices and even radios are network and internet enabled.

Mobile devices, such as mobile phones, tablets, readers, notebooks etc, are able to receive and store media and have powerful media (audio and video) capabilities and are connected to the internet via cell phone data services or broadband links, such as Wi-Fi that are high bandwidth and can access online media services that have wide and deep content.

The use cases or applications of these various forms of digital media, media services and media sources and playback systems have been evolving. Initially it was enough to connect a media source to a media destination over an IP network. This is widely used today with Internet based media source services, such as Netflix and a computer as a media destination. Users watch Netflix movies streamed over a wired IP network (the internet) to a computer. This is a case of a single point (one IP source) to single point (one IP destination) connection over a wired IP network. Even though the Netflix media service may send the same media to multiple households, each of these is a single point to single point connection TCP/IP connection. A further evolution of this is to use a wireless, Wi-Fi connection, instead of a wired Ethernet connection. This is still a single point to single point connection.

The applications targeted in this invention are for a further extension of the above use cases where the media source connects to multiple destinations rather than a single destination. These are single point (one IP source) to multi point (multiple IP destinations) applications. An example would be where a user is playing a 5.1 movie media file to a wireless video playback device and 6 independent wireless audio destinations making up a full 5.1 surround sound system. In this case the media is going from one media source to 7 media destinations simultaneously. In another example, a user is playing music from one media source to 6 audio playback systems placed around the home in 6 different rooms.

In both of these cases, it is necessary to play (render) the media at all destinations time synchronously. Furthermore, it is necessary to limit the use of resources at the media source, such as keeping memory use to a minimum. In addition, it is necessary with multiple devices receiving media to manage network bandwidth efficiently.

In some applications, the video media may be rendered through one path, for example a specialized hardware path, and the audio may be rendered through a different network path. When different media components of the same media are going through different paths, it is necessary to keep path delays (path latency) to a minimum. This is necessary to keep the different media components time synchronized. In these applications, keeping media network transport latencies to a minimum is important.

Furthermore, when the network is Wi-Fi, network packet losses can be high and it is necessary to mitigate these in order to deliver uninterrupted playback.

The general structure of these application are that of multiple IP networked media source devices choosing, connecting and playing media to one or more IP networked media playback devices over an IP communication network.

FIG. 1 shows an exemplary system 100 having multiple media source devices 104 and multiple media destination devices 106.

Figure 2:
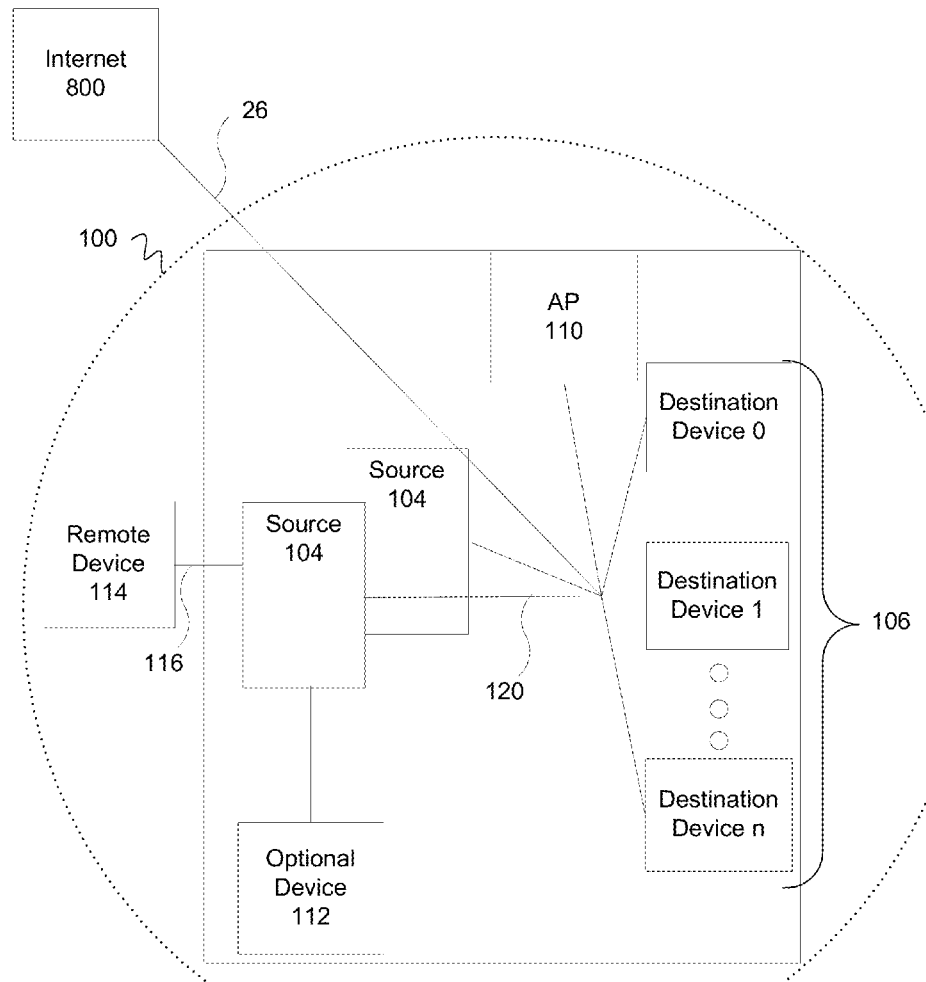
FIG. 2 illustrates a schematic of the devices in a system in accordance with one embodiment.

FIG. 2 is a schematic diagram of such a media system 100 with one or more IP network-enabled media source devices 104 and one or more IP network enabled media destination devices 106 connected via an IP network 120.

Referring to both FIG. 1 and FIG. 2, a media source device 104 can be any variety of computing devices that can originate digital media including computers (e.g. desktop, notebook 14, tablet 12, handheld), mobile devices (e.g. smart phone 10, electronic book reader, organizer devices), as well as set-top boxes and game machines 16. The media is any form of digital media, including audio or video, images, data, and/or Meta data.

Media destination devices 106 are devices that can receive digital media over an IP network 120 and play this media. This includes IP-enabled audio and/or video and/or imaging devices that can render audio or video or images or combinations of these at the same time. Media destination devices 106 include computers (e.g. desktop, notebook 15, tablet 13, handheld), mobile devices (e.g. smartphones, tablets, notebooks 15), network enabled TVs 20, network enabled audio devices 18, 22. If the media is audio, playing the media means rendering the audio such that a user can listen to the audio. If the media is video, playing means rendering the video such that a user can view the media. If the media includes both audio and video, it means rendering both the audio and the video. If the media is images, playing means displaying these images on a screen. In this description, media destination devices 106 may also be referred to as media renderers or combinations of these terms.

In the media environment 100 of the present invention, each media source 104 can send its media to a selected set of media destination devices 106 for playback.

The network 120 and all networks used and described in this invention to connect all devices, including the media sources 104 with the media destinations 106 may be any network that supports an IP protocol. This includes any wired IP connectivity mechanism including Ethernet if wired and if wireless it includes any wireless IP connectivity mechanism including Wi-Fi. If this 120 is a Wi-Fi network, then the network 120 may include a Wi-Fi access point (AP) or Wi-Fi router 110 that manages the network in infrastructure mode. Alternatively, the network 120 may be using Wi-Fi Direct (Wi-Fi Direct is a standard of the Wi-Fi Alliance), in which case the AP 110 may not be present. The IP network 120 may also be connected to the internet 800 through a wide area network connection 26. The source 104 may also have a remote device 114 associated with it such as a remote control device connected via an IP or other communication link 116. In addition the source 104 or network 120 may have additional optional devices 112 such as a NAS (Network Attached Storage) device that provides media.

IP networks can use several different types of messaging including unicast, multicast and broadcast messaging. Messaging being the sending of IP packets.

Unicast messaging is a type of Internet Protocol transmission in which information is sent from only one sender to only one receiver. In other words, Unicast transmission is a one-to-one node transmission between two nodes only. In unicasting each outgoing packet has a unicast destination address, which means it is destined for a particular destination that has that address. All other destinations that may hear that packet ignore the packet, if the packet's destination address is not the same as that destination's address. Broadcast is a type of Internet Protocol transmission in which information is sent from just one computer, but is received by all the computers connected on the network. This would mean that every time a computer or a node transmits a 'Broadcast' packet, all the other computers can receive that information packet. Multicast is a type of Internet Protocol transmission or communication in which there may be more than one sender and the information sent is meant for a set of receivers that have joined a multicast group, the set of receivers possibly being a subset of all the receivers. In multicasting, each multicast packet is addressed to a multicast address. This address is a group address. Any destination can subscribe to the address and therefore can listen and receive packets sent to the multicast address that it subscribed to. The benefit of multicasting is that a single multicast packet sent can be received by multiple destinations. This saves network traffic if the same packet needs to be sent to multiple destinations. When the same data needs to be sent to multiple IP destinations generally, Broadcasting or Multicasting, rather than Unicasting, provides the most efficient use of the network.

In this description the terms Broadcast and Multicast may be used. In both Broadcasting and Multicasting, when messages are sent, they are received by multiple destinations. Therefore in the present specification, the terms Broadcast and Multicast may be used interchangeably to refer to one packet being received by multiple destinations. In some cases this description only says the media is sent or transmitted without specifying whether it is broadcast, multicast or unicast. In this case, it means any one of these methods may be used for sending or transmitting the media.

In this description, the terms Message and Packet are often used and may be used interchangeably. A Packet is a data set to be sent or received on an Internet Protocol network. The Packet may or may not be the same as an 'Internet Protocol Packet'. A Message refers to the logical information contained in such a packet. In this description, the term Segment may also be used to refer to a data set. A data set is a set of bytes of data. Data may be any type of data, including media or control or informational data. In this description the term data and packet may also be used interchangeable depending on context. Packet refers to a data set and data refers to data in general.

Many IP protocols are accessed from software programs via a Socket application programming interface. This Socket interface is defined as part of the POSIX standard. POSIX is an acronym for "Portable Operating System Interface", which is a family of standards specified by the IEEE for maintaining compatibility between operating systems.

Currently when the same media data needs to be sent to multiple network destinations, the general technique for doing so is to use data multicasting to the multiple destinations that need to receive the data.

In such a system the media is multicast to all the destinations and it is up to each destination to attempt to render the media appropriately. If during rendering there is an error where a renderer does not receive new media data or does not receive it correctly, the renderer may render erroneous data and then attempt to recover and continue correct media rendering from the point after the error when correct data is received. For example, during rendering of a H264 stream, if there is an incidental data drop out, the displayed image may pixilate briefly and then recover.

In the applications envisioned here, there is a need to send media from a source to multiple media devices, such as TV and speakers in the same listening and viewing space. Furthermore there is a need to send this media over a wireless network such as Wi-Fi.

For these applications, this means all of the media rendering devices, such as speakers, that are in the same listening or viewing zone, need to be precisely synchronized to each other, so the listener and/or viewer does not discern any unintended media experience.

Secondly, because the media is transported over wireless, there is a very high likely hood of a media error, where the media is not received at each destination reliably or uniformly. If using broadcast or multicasts to send packets, the same broadcast or multi cast packet, may be received at one destination but not received/heard by another destination.

In order to synchronize the rendering of all media destinations, this invention uses a technique as described in U.S. patent application Ser. No. 11/627,957.

In this invention, in order to broadcast media over a Wi-Fi network, it is first necessary to recognize that broadcast or multicast media will not be received at all destinations uniformly. Some destinations will receive a multicast packet, while others will not.

IP networks were first designed to operate over wired networks. By design, the packet communications on these networks were 'best effort'. This means any packet transmitted on the network may not be received by the intended destination. This is most often due to a collision, where another device starts to communicate at the same moment as the device of interest, thereby causing a collision. Another method of loss would be the devices in the network path, such as routers, simply dropping the packet, for example due to the lack of buffer space. Other reasons for loss could be that the wired line is simply noisy and the packet transmission got corrupted, though this is rare for the wired case vs. the wireless case.

In all these wired situations, it is generally the case, that if the transmission, for example a multicast message, was received by one device on a 'subnet' or wire, all the other devices on the same 'wire' or subnet also receive the transmission correctly. This is because in the wired case, the noise or interference situation of a device on one part of the wire is not so different from the noise situation at another part of the wire. If the wired devices are connected via a switch rather than a hub, the same issues are true, the amount of noise or interference is minimal.

However, when using Wi-Fi, the situation is more complex. In wireless, the noise, standing wave, reflection situation can change from inch to inch. Each device on the same subnet does not see the same RF environment as another device right next to it. This means that any transmission, again for example a multicast message, will be received very differently at each Wi-Fi device in the same network—even if they are right next to each other.

Managed Receipt

This invention describes a mechanism for broadcasting data to multiple destinations and guaranteeing receipt at each destination.

Figure 3:
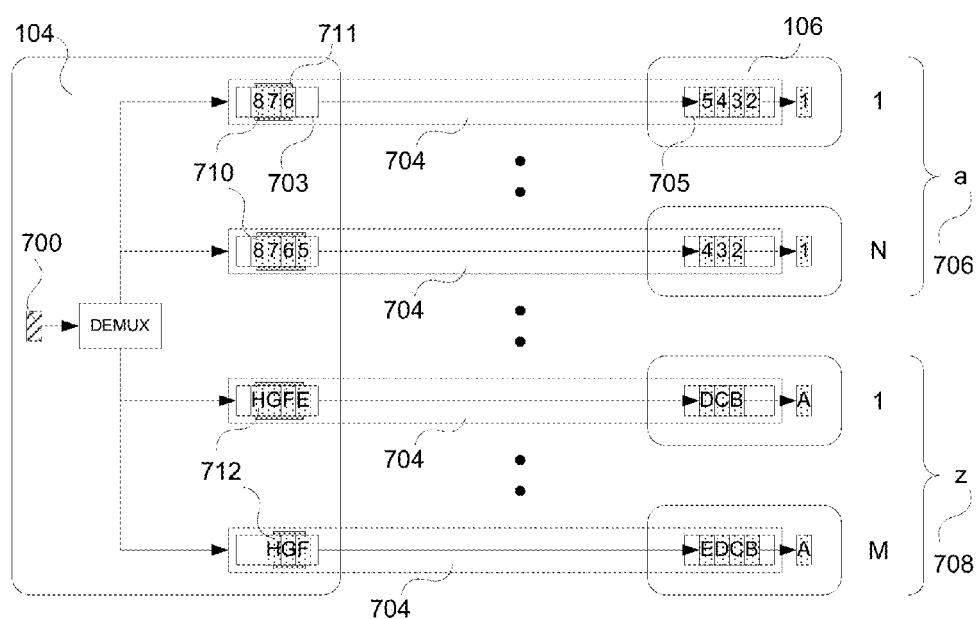
FIG. 3 illustrates the use of separate TCP (Transmission Control Protocol is one of the protocols of the Internet Protocol Suite) connections to multiple destinations.

One method of doing broadcasts with guaranteed receipt at each destination would be to use separate TCP connections to each destination. In this case, each TCP link would maintain a TCP packet buffer at the source for each destination, copy packets that are to be sent into each buffer, and then use a TCP type sliding window mechanism to send the packets to each destination. An example of this is shown in FIG. 3. Here, a source 104 is setup to send media packets to multiple destinations 106 numbered 1 through N, set 'a' 706 and 1 through M, set 'z', 708. In this example, each set of destinations consist of multiple devices that take the same type of data. So in this example set 'a' 706 may be N stereo audio devices that take stereo audio data, while set 'z' may be N video devices that take video data and render it. The media data 700 is sent to each destination 106 using TCP, with a TCP connection 704 to each device. As explained previously, with TCP, this means there is a TCP data buffer at the source 703 of each TCP connection 704 and a data buffer at each TCP destination 705. The data packets 710 put into the TCP data source buffer 703 are sent to each respective TCP destination 705 if the TCP source sliding window 711 will allow it. The sliding window 711 allows a certain number of packets to be sent beyond the last one that was acknowledged as received by the TCP destination 705. As packet receipts are acknowledged by the TCP destination 705, the back of the sliding window 711 moves forward, which will then allow additional packets to be sent. While this system will work, it is very wasteful of system resources. Firstly it is wasteful of memory at the source 104, as each packet 710 of a particular data type, selected by a demultiplexer, destined for devices of data type 'a' 706 is duplicated in each TCP source buffer 703 for each TCP link 704. Secondly this system is very wasteful of network resources as each packet 710 is sent multiple times at least once for each TCP connection 704 to each destination device 106. In the previous example, if there were 4 stereo audio destinations 106 (type 'a' 706) and two video destinations 106 (type 'z' 708), each audio packet would be transmitted at least 4 times on the network and each video packet would be transmitted at least 2 times on the network. This is of course very wasteful of network resources as it requires 4 times the stereo audio bandwidth and 2 times the video bandwidth of a single audio and single video system. The source 104 memory use and network bandwidth use increases proportionally to the number of destination devices 106.

Figure 4:
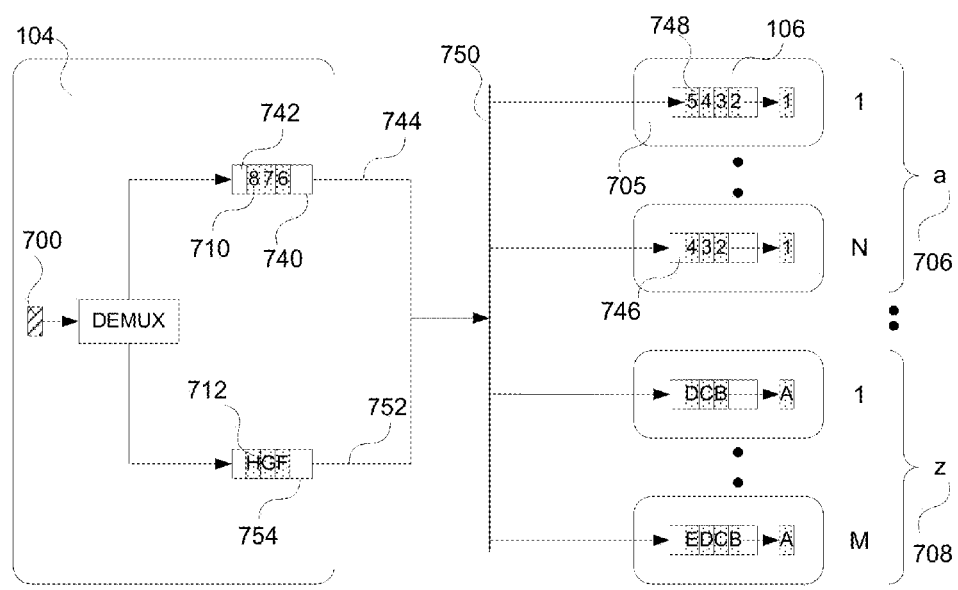
FIG. 4 illustrates the use of RTP (Real-time Transport Protocol developed by the Audio/Video Transport working group of the IETF standards organization) to send data to multiple destinations.

FIG. 4 shows an alternative approach to doing this, used by protocols such as the Real-time Transport Protocol (RTP), which uses multicasting of packets rather than unicasting.

In such a system as shown in FIG. 4, outgoing packets 700 of a particular type, separated out by a demultiplexer, are queued to be sent in an outgoing queue 740, 754. Packets are then multicast 744, 752 out onto the network 750. Each multicast packet is received by all destinations 106 and the destination accepts the packet if it is part of the multicast address. In this case all packets sent from queue 740 on link 744 which are destined for destination 106 set 'a' 706 are addressed to multicast address 'a' and all packets sent from queue 754 on link 752 which are destined for destination 106 set 'z' 708 are addressed to multicast address 'z'.

So, as in the previous example, if destination device set 'a' is stereo audio devices and destination device set 'z' is video devices then stereo audio packets 710 destined for device set 'a' 706 are only present in one buffer 740 at the source and are only sent on the network 750 once. Similarly video packets 712 are only buffered in one place and sent once. However, with this system there is no means to individually monitor the receipt status of packets and retransmit them if needed. In this system, if destination 106 number 1 receives packet number 5 748 and another destination 106 numbered N in the same set 'a', 706 does not receive packet number 5 in its buffer 746, then that packet is lost to destination number N.

This system saves media source 104 memory space and is not wasteful of network traffic, but it does not keep track of or aid in ensuring all packets are received at their target destinations.

Figure 5:
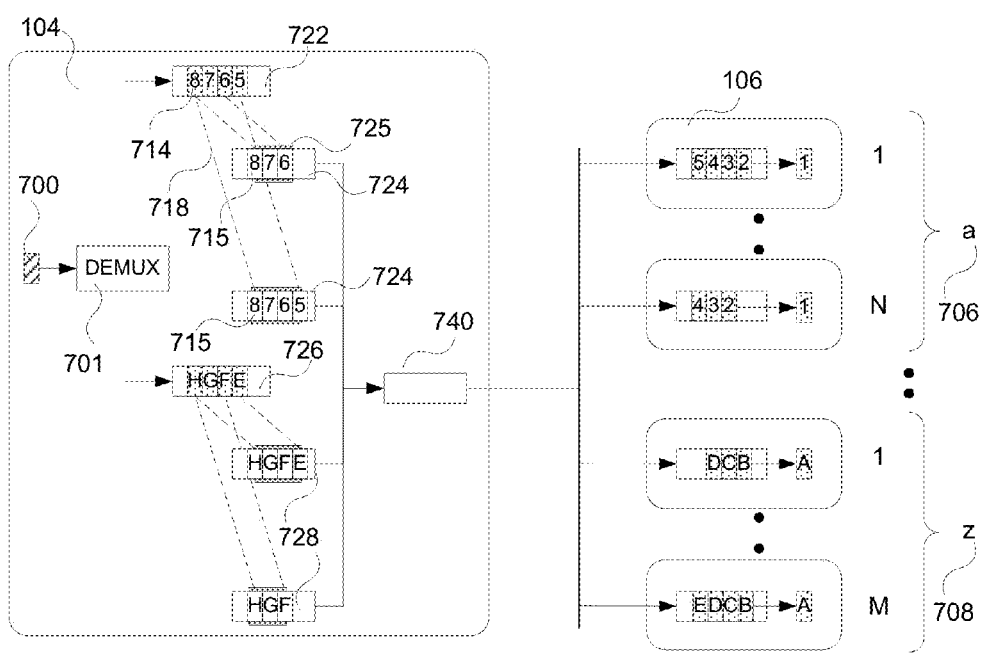
FIG. 5 illustrates the overall two-tier architecture.

Therefore this invention uses a system with a two tier architecture and multiple sliding windows as shown in FIG. 5.

This invention targets applications where media is being sent from a media source 104 to many destination devices 106 where the destination devices can be grouped into subsets that take the same type of data. For example an application may consist of two video/TV devices that take H264 video data and four stereo audio player devices that take 16 bit stereo audio data. In this case the optimum solution would be for the media source 104 to send one set of video packets that are received by both video devices and one set of 16 bit stereo audio data that is received by all 4 audio devices.

FIG. 5 shows the a general embodiment of this invention, where there are a number of destination devices 106 that are grouped into sets 'a' 706 through 'z' 708. Each set of devices takes a particular type of data. E.g. set 'a' 706 may be video devices that take H264 video data and set 'z' may be stereo audio devices that take 16 bit stereo audio data.

This system contains primary buffers 722, 726 (common collections) where packets are put into for sending to the destinations 106. Each primary buffer holds packets of a particular data type destined for a specific device set. A demultiplexer 701 selects (separates) which packets go in which primary buffer based on data type. Packets 700 to be sent to a destination are separated by data type and placed into the appropriate primary buffer 722, 726.

Figure 6:
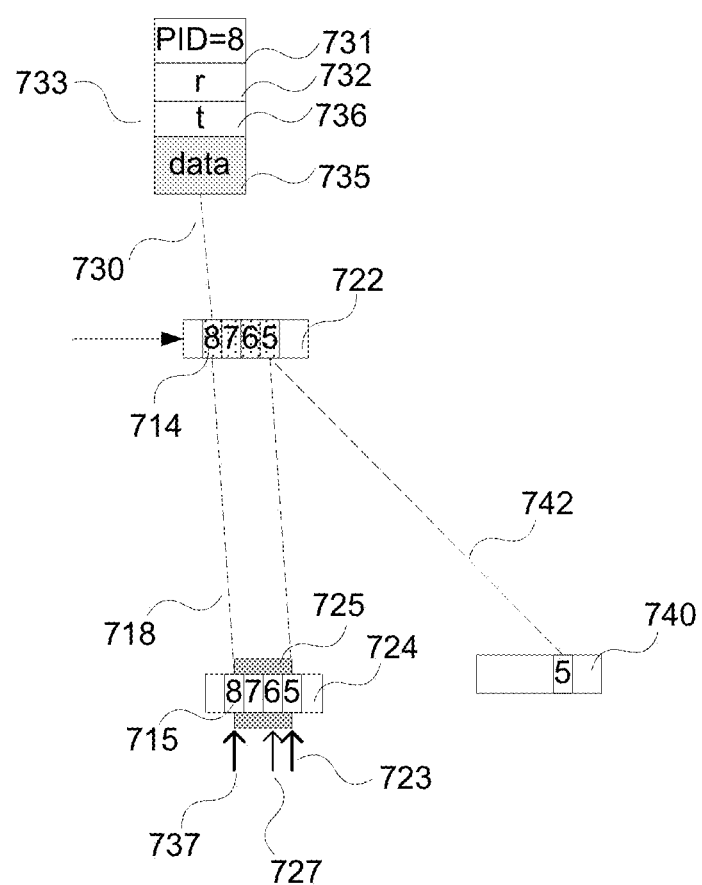
FIG. 6 illustrates details of the two tier buffers and relationships.

Each packet 733, see FIG. 6 which shows more details of FIG. 5, has a packet identifier (PID) 731 that is unique for each packet and is incremented from the previous packet put into the collection 722, 726. Note FIG. 6 only shows detail for the primary buffer 722 in FIG. 5 and virtual buffers 724; however the detail is the same for the primary buffers 726 and virtual buffers 728 shown in FIG. 5. Also the discussion may only refer to primary buffer 722 and virtual buffers 724; however the discussion also applies in the same way to primary buffers 726 and virtual buffers 728. Each packet also has a "references" number r, 732 that is used to keep track of the number of references to it. In addition each packet also has a time stamp 't' 736 that is used to keep track of its age. Each packet also of course contains media data 735 of a particular type.

The system also contains a virtual queue 724, 728 for each of the destinations 106 in the system. The virtual queue 724, 728 does not contain packets; instead it contains a "virtual packet" that points 718 to a packet in the common collection 722, 726. As shown in FIG. 6, the packet 714 may not actually be located in the common collection 722, but instead may reside somewhere else, with the common collection 722 only having a pointer 730 to where each packet actually resides in memory.

As each packet 714 is added into the common collection 722 for sending, a reference to it 715 is also added to each virtual queue 724 and the references number 732 in the packet 714 in the common collection is set to the same as the number of virtual queues 724 that have references to the packet.

Periodically, each virtual packet queue 724 is processed for selecting packets to be sent to the destinations. A packet is selected for sending based on a virtual queue 724 output PID 727; see FIG. 6, which points to the next packet to send and the end of the sliding window 725. If the output PID 727 points to a packet that is beyond the end of the sliding window 725 end PID 723, then no more packets, from that virtual queue 724, can be sent at the present. If the output PID 727 is not beyond the end of the sliding window 725 end PID 723, the virtual packet reference 727 of the packet is then used to get to the packet in the common collection 722. This packet is then selected for sending and the output PID 727 in the virtual output queue 724 is incremented once it is selected for sending. Note that even though the packet at the output PID 727 is selected for sending, the reference to this packet remains in the virtual output queue 724, as this packet may need to be resent.

All packets selected for sending are placed in the output queue 740 for sending to destinations. This is done by adding a reference 742 to the packet in the common collection 722 in the output queue 740 and incrementing the packets reference counter 732. If the output queue 740 already has a reference to a packet that has the same PID 731 as the packet that is about to be placed in the output queue 740, the packet is not placed in the output queue 740. This allows multiple virtual queues 724 and their respective destinations 104 to need the same packet, but only have the system send this packet out once to all destinations if they are being multicast from the output queue 740.

If the packets are being unicast to each destination, they are unicast to each destination associated with the virtual packet queue 724 that the packet was selected from.

The output queue 740 is processed periodically to multicast each packet in the queue onto the network. As each packet is multicast, the reference to it 742 is removed from the output queue 740 and the packets reference count 732 is decremented.

Each destination 106 will periodically or a-periodically send an acknowledgement to the source 104. In the acknowledgement is information on the highest consecutive PID received, the LastPID. The destination 106 keeps track of the consecutive PIDs it received since the start of communication. This is used by the source 104 to remove all virtual packets 715 in the virtual queue 724, for that destination, that have PIDs 731 that are lower than or equal to this LastPID. When packets are removed, if the window start PID 737 of the sliding window 725 point to packets that have been removed, the sliding window 725 window start PID 737 is incremented until it points to a packet in the virtual queue 724 that has not been removed. If this causes the window start PID 737 to be incremented a total of K counts, the window end PID 723 of the sliding window 725 is also incremented by K counts. This allows more packets to now be sent before they will hit the new window end PID 723 of the sliding window 725.

The effect of this is that each sliding window 725 for a virtual buffer 724 associated with a destination 106, is a count of the packets that are in transit to that destination. The larger this sliding window size is the more packets that can be in transit to this destination. The smaller this size of this window, the fewer packets can be in transit.

In a Wi-Fi network each Wi-Fi transmission consists of an uplink message from the transmission source to the AP and a downlink transmission from the AP to the final transmission destination. In this case the downlink from the Access Point to each destination can have different RF conditions. The downlink to one destination may be operating at a low bit rate due to distance while the downlink to a second destination may be operating at a high bit rate. Therefore the transmission to each destination will need to have different rates. Using a sliding window 725 per destination 106, allows the transmission rate to be set per destination 106.

For each packet removed from a virtual queue 724, 726 or output queue 740 if applicable, the references number 732 in the packet in the common collection 722 is decremented. If this reference number 732 is zero after decrementing, it means no packet queue, virtual packet queues 724 or the output queue 740, reference this packet any more. This is because all destinations 106 that could receive this packet, have acknowledged this packet as being received. Therefore if the reference number 732 is zero, the packet is discarded from the common collection 722.

A separate garbage collection process may also be present that will periodically check the common collection queue 722, 726. When packets 714 are put in the common collection queue 722, 726, the packet time stamp 't' 736, in the packet 733, is updated with the current time. During garbage collection, the age of each packet is computed by subtracting the packets time stamp 736 from the current time. If the packets age is older than a maximum age threshold the packet is discarded and all references to it in all virtual queues 724 and output queue 740 are removed.

During operation, each destination 106 will periodically send the source 104 a list of missing PIDs. These are PIDs of packets it never received. The source will on receipt of this list of missing PIDs, retransmit packets from the virtual packet queue 724 that have PIDs 731 that match the PIDs in the list of missing PID list to the destinations 106. This will be done by going through the virtual queue 724 for that destination and finding the missing PIDs 731 and adding these missing PIDs 731 to the output queue 740. The packets in the output queue 740 are multicast to destinations as mentioned above. This means that if several destinations 106 and virtual queues 724 select a packet with the same PID to be resent, it is resent only once. The destination 106 may also send missing packet notifications a-periodically.

This two tier architecture with a primary queue for each data type and multiple virtual queues for multiple destinations using the same data type and where each virtual queue maintains destination state with independent sliding windows and where a common output queue eliminates duplicate transmission, ensures minimal memory use and minimal network traffic while providing retransmission services to each destination to ensure packet receipt.

The present invention has been described in particular detail with respect to several possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of above description present the features of the present invention in terms of methods and symbolic representations of operations on information. These descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein.

The present invention is well suited to a wide variety of computer network systems over numerous topologies. Within this field, the configuration and management of large networks comprise storage devices and computers that are communicatively coupled to dissimilar computers and storage devices over a network, such as the Internet, public networks, private networks, or other networks enabling communication between computing systems.

The applications this invention are directed at that may be described above and any objects of this invention that are described above do not fully describe all the applications and objects of this invention and these descriptions are not intended to be limiting in anyway or manner Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A system for sending media over an IP network to media rendering devices, comprising:
    an internet protocol communication network;
    a first plurality of one or more first media rendering devices that take a first media data type and adapted to communicate with the communication network;
    a second plurality of zero or more second media rendering devices that take a second media data type that is different from the first media data type adapted to communicate with the communication network; and
    a media source adapted to communicate with the communication network and having access to media containing media data of the first media data type and of the second media data type, wherein the media data is grouped into packets of data wherein each packet comprises a set of media data, a reference counter field and a unique sequentially incrementing packet sequence number stored in a packet sequence number field;
    wherein the media source further comprises a primary packet buffer for holding data packets of the first media data type and a plurality of virtual packet buffers each comprising a plurality of packet sequence number references corresponding to a plurality of data packets of the first media data type that are contained in the primary packet buffer, each virtual packet buffer being associated with only one of the first plurality of media rendering devices;
    wherein a first packet of the first media data type is put in the primary packet buffer and a packet sequence number reference to the first packet is placed in each of the first virtual packet buffers, and the references counter field of the packet is set to the number of the first virtual packet buffers that have a packet sequence number reference to the first packet; and
    wherein the first packet in the first virtual packet buffer is sent to the first media rendering device.

2. The system of claim 1 in which the media source receives from a first media rendering device a received number that is the highest consecutive packet sequence number in the packets it has received and;
    wherein the media source removes references to all packets with a packet sequence number that is lower than or equal to the received number from the virtual packet buffer associated with the media rendering device and decrementing the references counter field in each packet removed from the virtual packet buffer.

3. The system of claim 1 in which a first virtual packet buffer in the media source maintains a first packet index, referencing the first packet stored in the first virtual packet buffer, and maintains a next packet index referencing the next stored packet in the first virtual packet buffer that may be sent to the media rendering device associated with the first virtual packet buffer; and wherein the packet referenced by the next packet index is sent to the media rendering device associated with the first virtual packet buffer and the next packet index of the first virtual packet buffer is incremented after sending the packet.

4. The system of claim 3 wherein the first virtual packet buffer will not send the packet referenced by the next packet index if the size of the difference between the next packet index and the first packet index is larger than a window threshold.

5. The system of claim 1 wherein the primary packet buffer holds a reference to the packet data.

\* \* \* \* \*